(12) United States Patent
Saito

(10) Patent No.: US 6,587,752 B1
(45) Date of Patent: Jul. 1, 2003

(54) ROBOT OPERATION TEACHING METHOD AND APPARATUS

(75) Inventor: Fuminori Saito, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 10/154,961

(22) Filed: May 28, 2002

(30) Foreign Application Priority Data

Dec. 25, 2001 (JP) ........................ 2001-391791

(51) Int. Cl.$^7$ ..................... G05B 15/00; G05B 19/00
(52) U.S. Cl. ................. 700/264; 700/245; 700/259; 700/260; 700/261; 318/561; 318/566; 318/587; 318/649; 318/568.11; 901/30; 901/31; 901/34; 901/47; 701/26; 701/159; 701/206
(58) Field of Search ............................... 700/245, 264, 700/213, 218, 222, 259–261; 318/561, 566, 568.11, 649, 587; 901/30, 31, 34, 47; 701/26, 159, 206, 213, 300; 600/130, 117, 103, 414, 424, 426, 427, 429, 439, 249; 345/184, 419

(56) References Cited

U.S. PATENT DOCUMENTS 6,305,019 B1 * 10/2001 Dyer et al. .............. 348/139
6,353,461 B1 * 3/2002 Shore et al. .............. 700/245
2001/0012001 A1 * 8/2001 Rekimoto et al. .......... 345/173
2001/0043721 A1 * 11/2001 Kravets et al. ............ 382/107
2001/0053970 A1 * 12/2001 Ford et al. .................... 704/9
2002/0003575 A1 * 1/2002 Marchese ................... 348/231
2002/0018124 A1 * 2/2002 Mottur et al. .............. 348/211
2002/0031120 A1 * 3/2002 Rakib ......................... 370/386

OTHER PUBLICATIONS

Langrock et al., Avanced telerobotics controller, 1994, IEEE, IEEE, pp. II–157–II–162.*
Tisdall et al., Testing a stereo vision system for motion compensation, 1994, IEEE, pp. II–182–II–187.*

* cited by examiner

Primary Examiner—William A. Cuchlinski, Jr.
Assistant Examiner—McDieune Marc
(74) Attorney, Agent, or Firm—Oblon, Spivak, McClelland Maier & Neustadt, P.C.

(57) ABSTRACT

A robot operation teaching method and apparatus includes a three-dimensional measuring system that can measure spatial coordinates corresponding to points designated on camera images, a display able to show a space image from a camera or cameras overlaid by an image of a geometric model corresponding to the space image. A pointing device having at least two degrees of freedom is used to define work trajectories by preparing, in a model space, simple geometric elements corresponding to the actual space image. By using parametric modelling to supply definitions of geometric elements in advance, the geometric elements can be adapted for other tasks by modifying some of the geometric element assignments and parameters associated with the definitions.

32 Claims, 5 Drawing Sheets

ROBOT OPERATION TEACHING METHOD AND APPARATUS

BACKGROUND OF THE INVENTION

1. Field of the Invention

The present invention relates to a method and apparatus for teaching robot operations, particularly to an operation teaching method and apparatus in which camera images are used to remotely teach robot tool trajectories.

2. Description of the Prior Art

Methods of providing trajectories for arms of robots engaged in assembly or machine operations include (i) the direct teaching method that uses a teaching box or the like to record locations through which the robot has passed and operates the robot in that order, and (ii) the program method that uses input of numerical data and formulas relating to location and attitude in the workspace.

Direct teaching has the following drawbacks.

(1) With a teaching box it is difficult to teach locations and orientations with high accuracy.

(2) In the case of remote operations, because there is a loss of depth information when only camera images are used, it is difficult to remotely teach robot spatial locations and orientations.

(3) Since each recorded location and orientation is provided separately, it is difficult to satisfy specific spatial relationships, such as, for example, a constraint that a tool is always in the same inclined plane.

Program-based teaching has the following drawbacks.

(4) It is necessary to know beforehand the location and geometry of objects and obstacles in the workspace coordinate system.

(5) The operator cannot intuitively understand teaching based on numerical values and formulas.

To resolve the above problems, the present inventor proposed in JP-A 2001-60108 a method of remotely teaching robot tool trajectories in which the teacher/operator uses image information of the workspace obtained by a camera or cameras to prepare simple, three-dimensional geometric elements corresponding, directly or indirectly, to the actual space, to enable the target task to be carried out readily and safely. In accordance with this method, camera images obtained from a three-dimensional image measuring system are shown on a display which the operator views as he uses an input device to define simple geometric elements based on the three-dimensional information. In this way, the frames necessary for defining the task trajectories of a work robot are set. The term "frame" is used as a close synonym for "coordinate system" to represent a 3-D position and orientation hereinafter. A frame has six degrees of freedom in space. Using the measuring system in conjunction with a drive system, such as robot arms, for changing the location and orientation of the measuring system made it possible to teach trajectories with good accuracy over the entire workspace region.

However, a premise of the above method was that the trajectories and the geometric elements comprising the trajectories were all to be defined online. Though some elements may need to be defined indirectly from the complex relationships among geometric elements, this defining had to be carried out on a task by task basis. This meant that even when it was desired to carry out teaching for a similar task, it was necessary to individually prepare each geometric element starting from the beginning. Moreover, the more complex the task trajectories become, the more necessary it is for the teacher to have an advanced knowledge of geometry and a deep understanding of the task structure, which limits the number of teachers capable of doing the teaching involved.

To resolve the above drawbacks, an object of the present invention is to provide a robot operation teaching method and apparatus that makes it possible to speedily and easily teach complex trajectories that vary depending on situations, utilizing an interface apparatus having two-dimensional interface functions.

SUMMARY OF THE INVENTION

To attain the above object, the present invention provides a robot operation teaching method comprising: using a three-dimensional measuring system capable of measuring spatial coordinates corresponding to points designated on camera images, a display able to display an actual space image obtained by a camera or cameras with an overlay of a geometric model image corresponding to the actual space image, and a pointing device having at least two degrees of freedom to enable all operator to prepare in a modal space simple geometric elements corresponding to the actual space image, thereby defining work trajectories; wherein by using parametric modelling to pre-define geometric elements, such as trajectories, geometric elements, such as trajectories, adapted for individual situations are produced by modifying a portion of geometric element assignments and parameters associated with a definition.

To attain the above object, the present invention also provides a robot operation teaching apparatus that comprises: a three-dimensional measuring system capable of measuring spatial coordinates corresponding to points designated on camera images; a display that displays an actual space image obtained by a camera or cameras overlaid by a geometric model image of geometric elements corresponding to the actual space image; a pointing device for selecting a location; and means for using parametric modelling to pre-define the geometric elements; the apparatus being able to produce geometric elements adapted for each situation by modification of a portion of geometric element assignments and parameters associated with a definition.

As described above, in the present invention, parametric modelling is used to pre-define trajectories in a form that can describe the spatial constraints between geometric elements determined based on task requirements. As a result, at the actual teaching stage, a required trajectory can be generated by just selecting a trajectory from a menu and teaching the minimum amount of information needed for defining that trajectory. Thus, the operator is able to perform the teaching quickly with less fatigue, without having to take into account details about depth.

Further features of the invention, its nature and various advantages will be more apparent from the accompanying drawings and following detailed description of the invention.

DESCRIPTION OF THE PREFERRED EMBODIMENT

Figure 1:
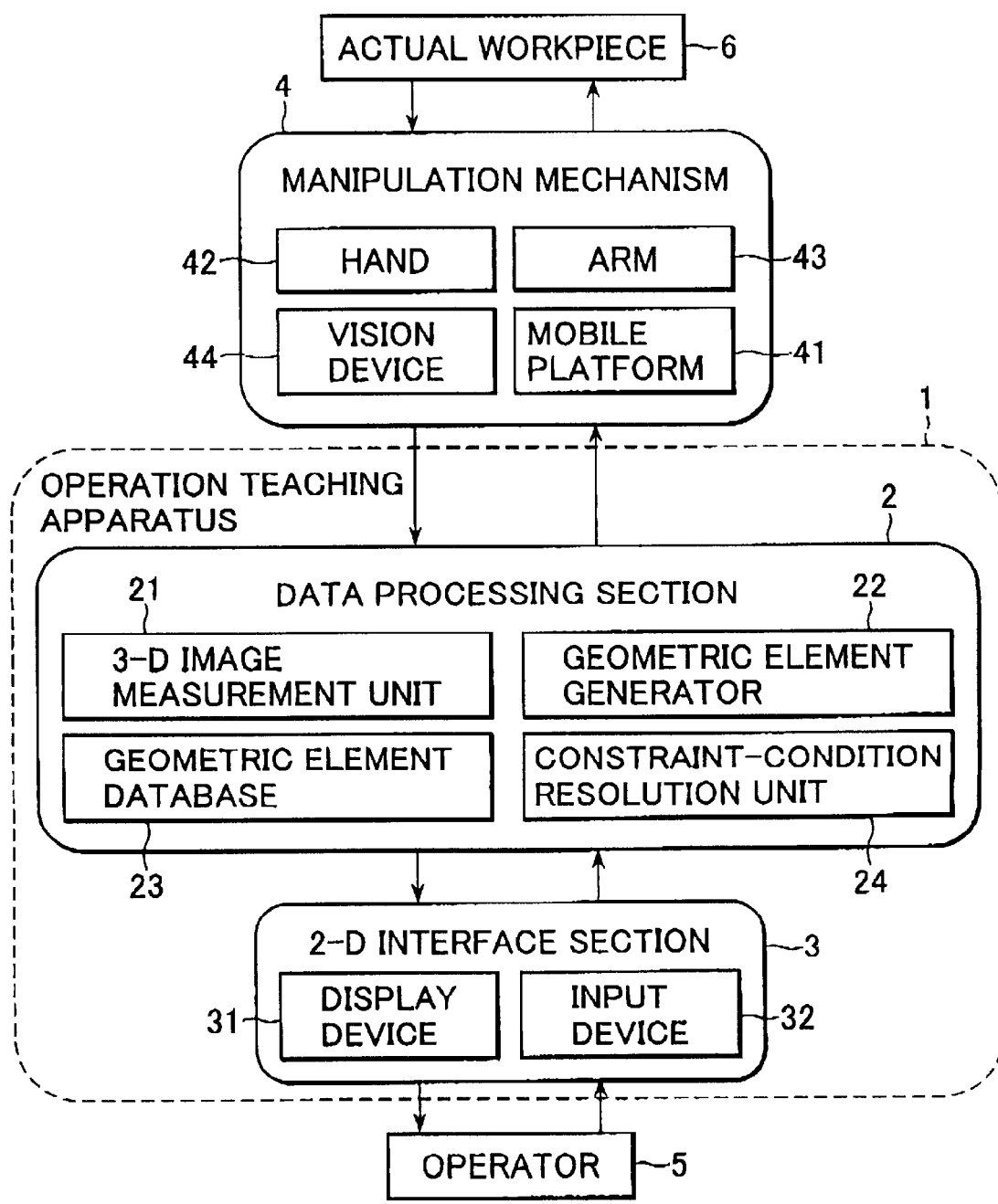
FIG. 1 shows an example of a system configuration using the robot operation teaching apparatus of the present invention.

First, the operation teaching system will be described, with reference to the example of a system configuration using the robot operation teaching apparatus of the invention shown in FIG. 1. With reference to the drawing, an operation teaching apparatus 1 includes a data processing section 2 and a two-dimensional interface section 3. The operator 5 issues instructions to teach motion operations to be carried out by a manipulation mechanism 4.

The manipulation mechanism 4 includes a mobile platform 41 that has a robot hand 42 as the work tool used for gripping an object, and a robot arm 43 on which the robot hand 42 is mounted, and a vision device 44, such as a stereo camera, or other such device.

The data processing section 2 includes a three-dimensional image measurement unit 21, a geometric element generator 22, a geometric element database 23 and a constraint-condition resolution unit 24. In accordance with instructions from the operator 5 referring to actual space images obtained from the vision device 44, the three-dimensional image measurement unit 21 measures corresponding spatial locations in the actual space. The relationship between the spatial coordinate system used by the three-dimensional image measurement unit 21 and the tool frame given to the robot hand 42 is assumed to be known by means of calibration etc., or can be estimated sequentially based on sensor feedback information from a camera or other such device. In addition to three-dimensional measuring by images using a stereo camera as the vision device 44, it is also possible to carry out measurements using a mono-camera that is moved to obtain images from different viewing points, to use the focus to measure distances, or to utilize the range-finder principle to perform three-dimensional image measurements using a laser or other light source.

In accordance with the directions of the operator received via the 2-D interface section 3, the geometric element generator 22 instantiates the definitions of the various geometric elements, such as trajectories, and the definitions in the geometric element database 23. The constraint-condition resolution unit 24 adjusts geometric element parameters to satisfy various constraints applied by the operator; for example, constraining the tool frame on a prescribed trajectory, or that movement be in parallel with line or plane elements, or rotational around line or point elements, and so forth. Although in FIG. 1 the data processing section 2 is shown as being separate, it can be mounted on the mobile platform 41 so that it moves together with the manipulation mechanism 4.

Figure 2:
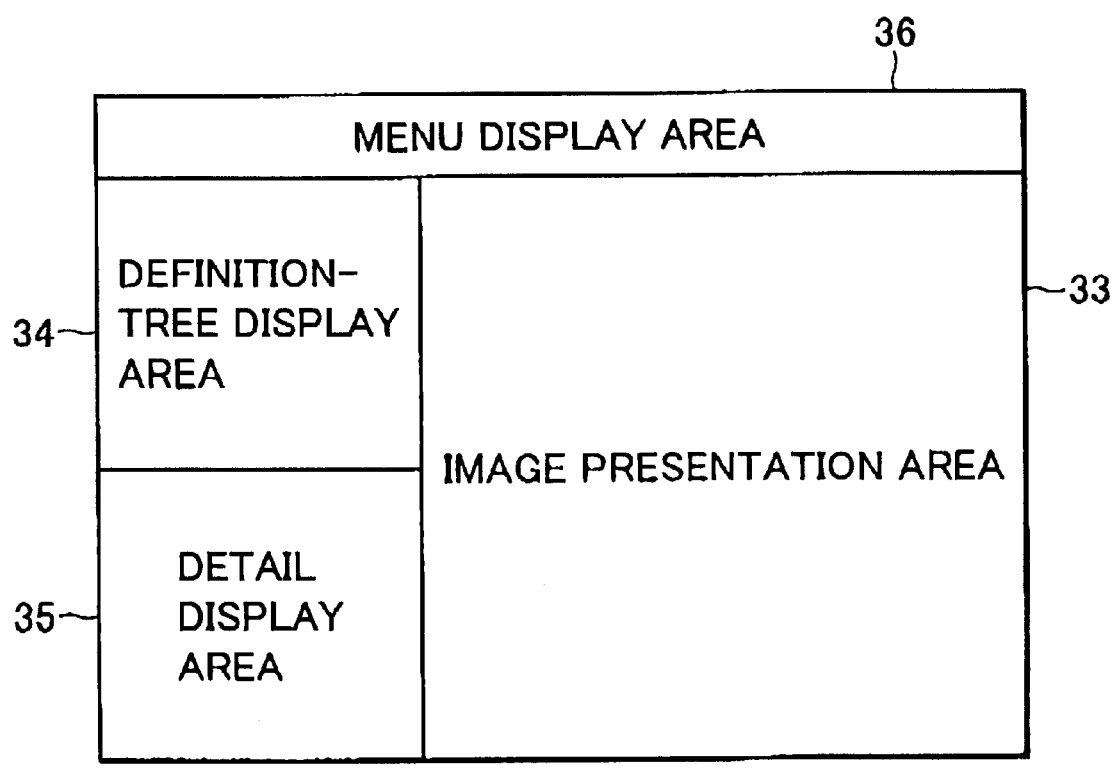
FIG. 2 shows an example of the screen display used by the apparatus of the invention.

The 2-D interface section 3 is an interactive interface comprised of a display device 31 and an input device 32. The display device 31 is an ordinary two-dimensional display, arid the input device 32 is an ordinary two-dimensional pointing device such as a mouse or touch-panel. The display device 31 displays information such as details of the processing performed by the data processing section 2. FIG. 2 shows an example of on-screen arrangement of the display device 31. The image presentation area 33 is used to display an image of the actual space that is obtained from the vision device 44. The same image is fed to the 3-D image measurement unit 21. Geometric elements, such as teaching trajectories, in model space can be shown as an overlay on the actual space image. The definition-tree display area 34 is used to display geometric element definition trees, and the detail display area 35 is used to display details relating to selected geometric elements. The menu display area 36 displays the various menus such as for preparing trajectories. The display device 31 is used for displaying a pointer, sensor information and other numerical data the operator wants to know.

The operator 5 can use the input device 32 to select locations (such as by pressing a button in the case of a mouse, or tapping in the case of a touch-panel) on an image, select menus, perform drag-and-drop operations, draw shapes, and so forth.

In the invention it is assumed that the operator 5 operates the robot via the 2-D interface section 3, so it is not necessary to be able to directly see either the work environment that contains the actual workpiece 6 or the manipulation mechanism 4. As the interface section, there can be used an ordinary two-dimensional device. This makes it possible to utilize ordinary portable devices having two-dimensional interfaces and wireless communication systems such as portable telephones and PDAs ("personal digital assistant" information devices), thereby making it possible to readily carry out the robot teaching from a remote location. Details of the operation of the 2-D interface section 3 are described below.

Implementing trajectory libraries and menus for each task: Details of parametric definitions are described later. To implement parametric definitions of geometric elements, such as trajectories, for each task, it is necessary to categorize the target tasks and consider how constraint conditions should be described. This requires someone who has a good knowledge of geometry and an understanding of the essence of the target task. However, at the stage of instantiation of the already defined geometric elements, such as trajectories, a limited knowledge pertaining Dust to an outline of the task and the conditions required for the instantiation is enough; it is not necessary to understand the overall parametric definition of the trajectories.

Thus, this invention makes it possible to divide the teaching operation into two stages. One is a preparation stage, in which a person having adequate knowledge composes the parametric definitions of the geometric elements, stores them in a library and makes them possible to be selected by menu. The other is an execution stage in which menus are used to select geometric elements from among the library thus prepared for executing tasks satisfying various constraint conditions.

To instantiate, at the execution stage, the geometric elements parametrically defined at the preparation stage, the operator 5 defines a necessary number of partial models of the environment and object, then assigns the geometric models to the objective parametric definitions selected from a menu. Since at this point it is not necessary to carry out detailed modelling of the whole environment or object, teaching can be performed easily and speedily even if the target object and environment are unknown.

Figure 3:
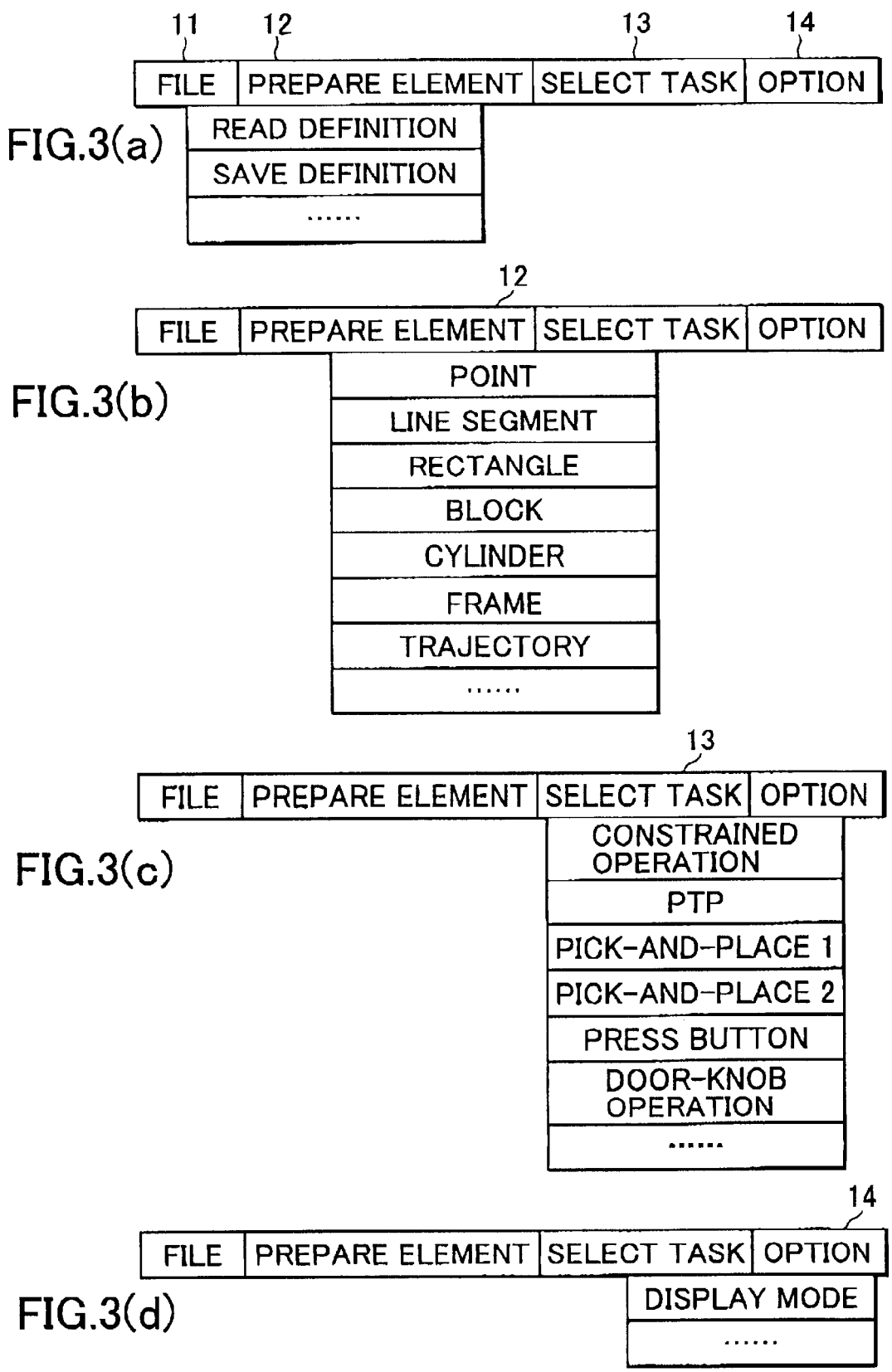
FIG. 3 shows examples of drop-down menus shown on the display of FIG. 2.

FIG. 3 shows on-screen drop-down menu examples. The File 11 menu is used to read and write stored definitions (FIG. 3(a)). The Prepare Element 12 menu is used to select the type of geometric element and, from a snub-menu, to select the definition method for preparing the elements (FIG. 3(b)). The Select Task 13 menu is used to select the target task to instantiate parametrically predefined trajectories. The size of the menu increases as the number of task increases. Thus, menu selection should be facilitated by sorting the library of tasks with categories and displaying a menu in a hierarchical manner (FIG. 3(c)). The Option 14 menu is used for setting the options, such as display method used by the display device (FIG. 3(d)).

Displaying definition structures of geometric elements: The definition-tree display area 34 (FIG. 2) is used to display geometric relationships of elements in definition structures in the form of a graphical tree representation, such as that shown in FIG. 4. Details of a specific element can be viewed by clicking its element icon with the pointer. Doing this causes the details to be displayed in a detail display area, examples of which are shown in FIG. 5. In FIG. 5, parameters that can be changed are shown underlined.

Figure 6A:
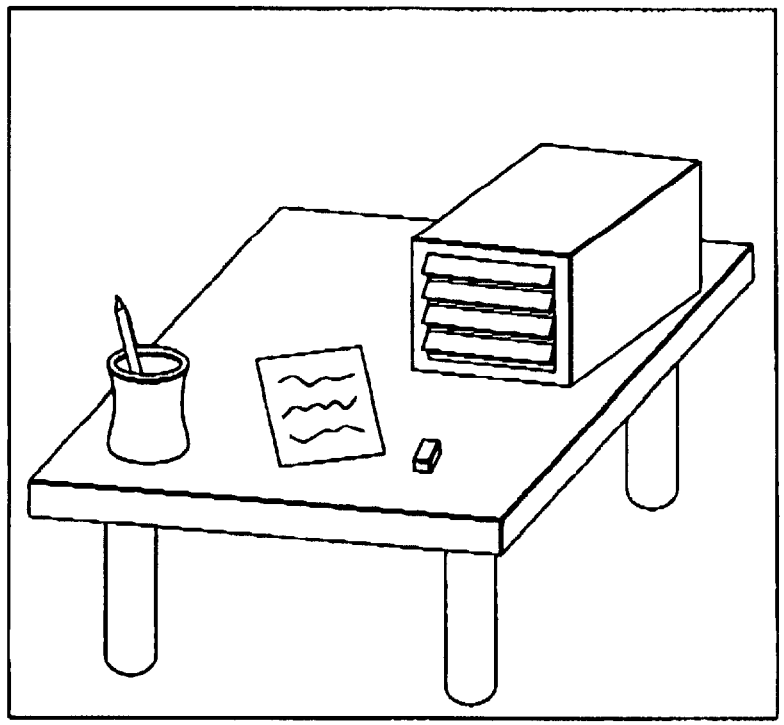
FIG. 6 illustrates an example of the image presentation area, with FIG. 6(a) showing just the camera image and FIG. 6(b) showing the image of FIG. 6(a) overlaid with an image of the model space.
Figure 6B:
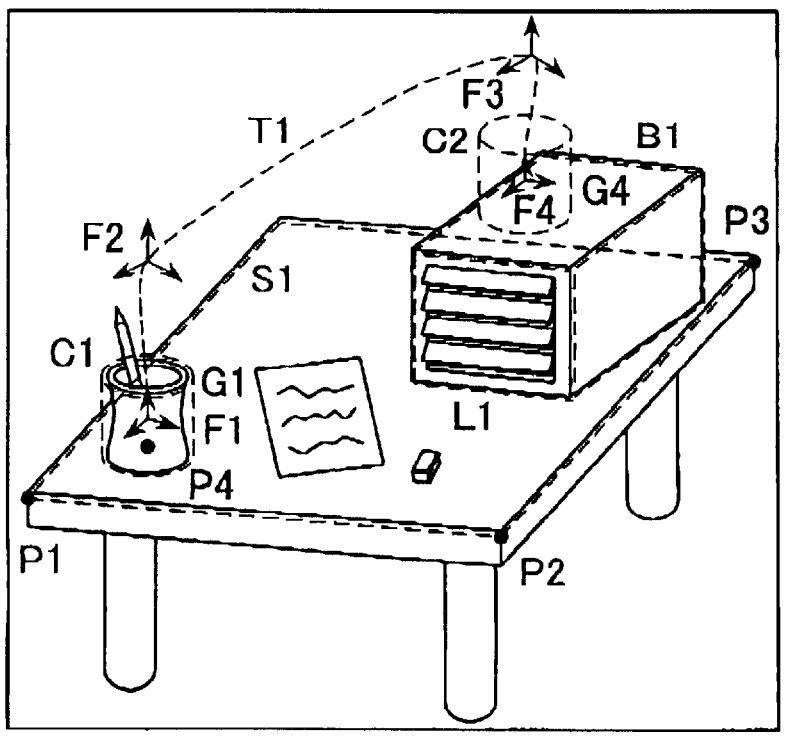

The geometric elements are displayed by overlaying a model space image on the corresponding actual image obtained from the camera. The model space image is a projection image onto a two-dimensional image plane from a three-dimensional model space. An example is illustrated by FIG. 6, which shows the camera image (FIG. 6(a)) and the camera image overlaid by the model space image (FIG. 6(b)). This type of display makes it easier for the operator to understand the relationship between the real space and the model space. Selection of geometric elements can also be done within the image presentation area 33 by pointing the elements in the model image. Detail data relating to the selected elements can be displayed and changed in the detail display area 35 in the same way as when the definition-tree is used.

Drag-and-drop instantiation of parametrically defined geometric elements: Selecting an element contained in a definition history by pointing the element in a definition tree display or model image display and performing drag-and-drop of the selected element close to another element, the operator 5 generate a new element instance or update an existing instance. These pointer-based menu selection and drag-and-drop operations make it possible to readily generate geometric elements set by complex constraint conditions.

The parametric definition of geometric elements, which is an important concept in the present invention, will now be described.

In the CAD field, the method known as parametric design is used to facilitate the modelling of products. In the CAD terminology of JIS B3401-1993, parametric design is defined as a design method used to typify the shapes of products and parts thereof and assign dimensions to the typified shapes using parameters, thereby readily generating models in a computer. Parametric Technology Corporation's "Pro/ENGINEER" is an example of commercially available three-dimensional CAD software used in parametric design techniques. In addition to handling just shapes, this type of 3-D CAD program defines geometric models as sets of constraint conditions. Here, a constraint is a condition prescribing a geometric model's size, positional relationships, and so forth. There are dimensional constraints that prescribe size and dimensions, and geometric constraints that prescribe geometric relationships.

A dimensional constraint constrains a geometry to the dimensional values designated by the operator. If the operator changes the dimensional values, there will be a corresponding change in the geometric data. Geometric constraints determine positional relationships between geometric elements, such as that line segments be parallel, or that line segments and arcs be in contact (tangency is satisfied), or that end points are shared (continuity is satisfied).

In the present invention, based on a concept similar to that of CAD-based parametric modelling of products, "a modelling technique in which the generation of geometric models in the computer is facilitated by typifying geometric elements, using parameters to assign locations and distances and describing geometric relationships with other geometric elements" will be called the technique of parametrically modelling geometric elements. That is to say, the definitions of the trajectories for robot motion and geometric elements for prescribing those trajectories are parametrically typified in place of the typifying of product models, thereby making it easier to teach the target robot operation. Here, constraints that numerically prescribe locations, distances and so forth are called numerical constraints, and constraints that prescribe relationships between geometric elements are called geometric constraints.

The feature of parametric modelling is that the definition history is retained in the form of numerical and geometric constraints. In contrast, in ordinary geometric modelling, what is retained are the coordinate values and other such numerical data in each geometric element. For example, if a line segment s is defined from point a and point b, after which point c is defined as the middle point of line segment s, in ordinary geometric modelling, point c is retained only as numerical data of coordinate values (x, y, z) produced by the geometric calculation. How the operation was performed is not retained. Therefore, after the defining operation, there is no relationship between the data of points a and b, and point c, so changing point a or point b will have no effect on point c. In the case of parametric modelling, however, the element definition history can be retraced, making it possible, either automatically or as required, for point c to reflect any changes made to point a or point b. Moreover, by using the data structure, as-is, by reassigning points a and b to points e and f, respectively, it is possible to readily define a new point, point g, as the middle point of point e and point f.

Because in this parametric modelling technique the definition history is retained, it is very easy to modify geometric elements that were created by a complex definition process, and to create new geometric elements of the same type. Therefore, by parametrically modelling geometric elements beforehand that include numerical and/or geometric constraints determined according to the target robot task concerned, a trajectory can be taught by preparing the minimum geometric elements required, without having to go through complex definitions online, and trajectories can also be readily modified.

Constraints: Robot teaching can be carried out by modifying locations and orientations of tool frame settings. The frame has six degrees of freedom, but depending on the task, the number of degrees can be reduced by applying appropriate constraint conditions. The constraint-condition resolution unit 24 enables the definition parameters of the frame to be updated with continuously satisfying applied constraint conditions, making it possible to readily control robot motions via just a two-dimensional interface.

Examples of constraint conditions include constraints on translational or rotational motion relative to a reference geometric element. These constrain a frame to motion that is parallel to line or plane elements, or to rotational motion about point or line elements. Generally, an arbitrary configuration under such constraints can be directed with an operation input of two degrees of freedom.

Another constraint method is to assign a trajectory and constrain the frame along the trajectory. A frame along a trajectory can be expressed by scalar variables, using a method described below. This makes it possible to specify an arbitrary configuration on the trajectory with an operation input of just one degree of freedom. Another example of a constraint method involves assigning limits to positional and postural values and to related rate-of-changes based on time. This can be used to keep a location or posture inside a certain area. Designating free space as the region concerned, for example, would make it possible to automatically avoid a collision with an object while the operator freely operates the tool frame. Also, safe robot operation can be ensured by preventing sudden motions by placing a limit on the degree of change that is possible in a prescribed time-frame.

Trajectories: In this invention, a trajectory refers to the path of a frame that changes in accordance with the value of a single, continuous scalar variable; when the scalar value is given, the corresponding frame is determined on a one-to-one basis. Specific trajectory representations could include assigning a plurality of frames and the order thereof, and using linear or spline functions for continuous interpolation of each of the position vectors and rotation vectors thereof to thereby obtain a continuous frame path in which the frames are smoothly connected. Frames on the trajectory can be obtained by modifying the scalar variable value online at operator's own will, changing the value according to time, and controlling the value as a control variable for a feedback controller, and the frames thereof are to be used as target values of the robot tool frame.

The simplest example of a trajectory definition is a method to interpolate two frames furnished at a start point and end point. Specifically, when the start point frame and the end point frame are to be interpolated by a scalar parameter u that changes from 0 to 1, first, position vectors of each frame and a rotation vector of the end point frame from the start point frame are obtained. Next, a position vector is obtained from interpolation of the position vectors thereof with respect to u, and a rotation vector is obtained by multiplying the rotation vector thereof by the rate of change of u (the rate of change of u is obtained by (u—"u at the rotation reference frame")/("u at the post-rotation frame"—"u at the rotation reference frame"), namely in this case, (u−0)/(1−0)=u, i.e. the rate of change of u here is u itself). Then, the interpolation frame is determined from the position and the rotation vectors just obtained. This interpolation frame describes a trajectory that is continuously interpolated between two frames in accordance with the change of u. Similarly, when there are three or more frames, by obtaining the position vectors of each frame, taking the vector of rotation from the preceding frame as the rotation vector, and interpolating these vectors, it is possible to compose more complex trajectories. It is also possible to apply curve-fitting interpolation, such as spline interpolation, to the position vectors.

In this definition method, regarding the fact that trajectories are configured from relationships among a plurality of given frames, the trajectories can be said to be expressed from geometric constraints and, namely, already be defined parametrically. In addition to this, by defining the frames composing the trajectories in the parametric modelling style in relation to other geometric elements, it is further possible to add to the trajectories various constraints according to the objective. This eliminates the need for the operator to constantly think about the requisite motion constraints during the actual operation procedure.

Geometric elements and defining method: Specific examples of methods of defining geometric elements, such as trajectories, will now be discussed.

The types of geometric elements that are considered are point, straight line, line segment, curved line, curved line section, plane, plane region, curved surface, curved surface region, block, cylinder, vector, frame and trajectory. Of these, straight line, line segment, curved line and curved line section will be collectively referred to as line elements; plane, plane region, curved surface and curved surface region as surface elements; and block and cylinder as solid geometry elements. However, it is to be understood that the geometric elements are not limited to these, and that other elements may be incorporated as required for the purpose at hand without any change to the essential nature of the invention.

Methods of preparing the elements include the direct definition method, the indirect definition method and the appended definition method. These methods will be described below.

Direct definition method: The method in which numerical constraint parameters of each geometric element are directly input by the operator (this is called the general direct definition method), or given by the direct measurement of the target, using the 3-D image measurement unit 21, as in the examples below, is called the direct definition method.

(a) Point definition: Three-dimensional image measurement is used to find the location of a point in a three-dimensional workspace corresponding to a point designated by the operator on a two-dimensional camera image displayed on the display device 31, and the point location thus found is defined as a point element.

(b) Straight line definition: Three-dimensional image measurement is used to find the three-dimensional locations of a plurality of points along the linear contour traced by the operator on the two-dimensional camera image shown on the display device 31. These points are then subjected to least squares approximation to obtain a straight line in the space that is defined as a straight line element.

(c) Plane definition: Three-dimensional image measurement is used to find the three-dimensional locations of a plurality of points included in a region designated by the operator on the two-dimensional camera image shown on the display device 31. These points are then subjected to least squares approximation to obtain a plane in space that is defined as a plane element.

(d) Curved surface definition; As in the case of the plane definition, an approximation of a curved surface that passes through the three-dimensional locations of a plurality of points within a region designated by the operator is obtained and defined as a curved surface element.

Indirect definition method: This definition method utilizes previously defined geometric elements to define new geometric elements. Specific examples are described below. In addition to the following, it is possible to define elements using various geometric calculations. Also, methods that apply translation, rotation, enlargement, reduction and other such transformations to geometric elements to define different geometric elements are general indirect definition methods.

(a)Point definition: ① An intersection between a previously defined surface element and line element designated by the operator is defined as a point. ② An intersection between two previously defined straight lines on the same plane designated by the operator is defined as a point. (When the two lines are not completely within the same plane, the intersection is approximated using the center point of a line segment that provides the shortest connection between points on the two lines.) ③ With respect to a previously defined surface element designated by the operator and the position of a point on a two-dimensional camera image also designated by the operator, a point in space that is on the surface element and corresponds to the position of the designated point on the camera image is defined. (Designating a point on the two-dimensional camera image means specifying a set of points in space projectable onto the point location, namely specifying a straight line, therefore this corresponds to a special case of obtaining the point of intersection between surface and line elements.) ④ By designating a previously defined line element and a point on a two-dimensional display image of the line element, the operator defines a point on the line element actually projected.

(b) Straight line definition: ① The operator defines a straight line by designating two previously defined points through which the line passes. ② The operator defines a line as an intersection between two previously defined planes designated by the operator. ③ When a stereo camera is used, by drawing one line on each of two different two-dimensional camera images shown on the display device, the operator defines a line in space that is projected onto the lines drawn on each image. (Drawing a line on a two-dimensional camera image is the same as applying a spatial plane constraint, so this corresponds to a special case of obtaining the line of intersection between two planes.)

(c) Line segment definition: ① The operator defines a line segment by designating two previously defined points as the end points of the line segment. ② By designating a previously defined line and two points on a two-dimensional display image of the line, a line segment is defined as a section on the line.

(d) Curved line definition: ① A plurality of previously defined points designated by the operator are used to define a curved line by applying a spline curve or other such curve-fitting interpolation method. ② The operator defines a curved line in space by projecting an arbitrarily drawn two-dimensional curve onto a previously defined plane or plane region designated by the operator from its normal direction. ③ The operator defines a curved line in space by projecting an arbitrarily drawn two-dimensional curve from the direction of a vector specified by the operator onto a previously defined curved surface or curved surface region designated by the operator.

(e) Curved line section definition: ① The operator defines a curved line section as a section of a curved line between two end points in space by designating a previously defined curved line and corresponding two end points on a two-dimensional display image of the curve.

(f) Plane definition: ① The operator designates three previously defined points to define a plane that includes the points. ② The operator designates two previously defined intersecting lines to define a plane that includes the lines. ③ The operator designates a previously defined line and point to define a plane that includes the line and point.

(g) Plane region definition: ① By designating a previously defined plane and a closed region on a two-dimensional display image of the plane, the operator defines a plane region as the portion where the closed region is projected on the plane. ② By designating two previously defined line segments that share a common end point, the operator defines as a plane region a parallelogram region in space in which two sides are formed by the two line segments.

(h) Curved surface definition: ① Using three or more previously defined points designated by the operator, an approximated curved surface that passes through the points is defined by interpolation. ② Two previously defined curved lines are designated by the operator to define a curved surface as the path obtained when one curved line is subjected to parallel translation along the other curved line.

(i) Curved surface region definition: ① By designating a previously defined curved surface and a closed region on a two-dimensional display image of the curved surface, the operator defines the curved surface region as the portion where the closed region is projected on the curved surface.

(j) Block definition: ① Viewing a two-dimensional display image that shows the actual image with an overlay of a block having one edge formed by a previously defined line segment designated by the operator, a pre-assigned ratio of three edges, and a pre-assigned rotation angle about the designated line segment, the operator defines a block by making appropriate changes to the lengths of the two pre-assigned edges and the rotation angle about the designated line segment. ② Viewing a two-dimensional display image that shows the actual image with an overlay of a block having a pre-assigned height and one face formed of a previously defined plane region in a rectangular shape designated by the operator, the operator defines a block by making an appropriate change to the pre-assigned height. ③ Viewing a two-dimensional display image that shows the actual image with an overlay of a block having three edges of pre-assigned length, a vertex formed at an origin of a previously defined frame designated by the operator and the edges aligned to the three axes of the designated frame, the operator defines a block by making appropriate changes to the pre-assigned lengths of the three edges.

(k) Cylinder definition: ① Viewing a two-dimensional display image that shows the actual image with an overlay of a cylinder of pre-assigned diameter having as a central axis a previously defined line segment designated by the operator, with the end points thereof being at the center of the cylinder end faces, the operator defines a cylinder by making an appropriate change to the pre-assigned diameter. ② Designating a previously defined plane and a point on the plane, and viewing a two-dimensional display image that shows the actual image with an overlay of a cylinder having a pre-assigned height and diameter, an end face formed by the designated plane, and the center of the end face specified by the designated point, the operator defines a cylinder by making an appropriate change to the pre-assigned diameter and height. ③ When a stereo camera is used, by drawing on each of the two camera images two two-dimensional straight lines corresponding to the contours at each side of the cylinder the operator wishes to define, the operator defines the cylinder face for approximation based on the geometric conditions to make the two-dimensional straight lines drawn by the operator match the projected contours of the cylinder face, then specifies positions of the two points on the two-dimensional display image of the central axis of the cylinder face to designate the locations of the two points at the center of each of the cylinder's end faces to define a cylinder.

(l) Vector definition: ① Two previously defined points and the order thereof are designated by the operator to define a vector connecting the points. ② The operator designates a previously defined straight line or line segment and defines a vector along the line or line segment by specifying a length and orientation. ③ The operator designates a previously defined plane or plane region and defines a vector in a normal direction thereto by specifying a length and orientation. ④ The operator designates a previously defined curved surface (or curved surface region; this also applies hereinbelow) and a point on that surface, then defines a vector in a direction normal to the point position on the curved surface by specifying a length and orientation. ⑤ The operator designates a previously defined vector or plurality of vectors and defines a new vector by specifying operations to the vector or vectors such as constant power, inner product and outer product.

(m) Frame definition: ① The operator designates a previously defined point and two orthogonal vectors and defines a frame having the origin at the point, the three principal axes along the two vectors and the vector product thereof, and the orientation designated by the operator. ② The operator designates a previously defined point and plane (or plane region; this also applies hereinbelow), and a straight line included in the plane, and defines a frame having the origin at the point, the three principal axes along the straight line, direction orthogonal to the straight line in the plane and direction normal to the plane, and the orientation designated by the operator. ③ The operator designates a previously defined trajectory and an arbitrary scalar value between 0 and 1 to define a frame on a trajectory corresponding to the scalar value.

(n) Trajectory definition: ① The operator designates a previously defined plurality of frames and a scalar value associated with each frame that increases monotonically from 0 to 1 to define a trajectory by linear or spline interpolation of the frames. ② The operator designates a previously defined trajectory and frame and an arbitrary scalar value between 0 and 1, and defines a trajectory by adding the frame to the previously defined trajectory so as to pass the frame at the scalar value.

Appended definition method: With respect to the process of defining geometric elements by the direct or indirect method, in some cases it is ultimately better to pre-define geometric elements having a deep relationship to the geometric elements to be defined. For example, there are cases in which a vector corresponding to the direction vector of a straight line is appended to the straight line; two point elements corresponding to the end points of a line segment and a vector corresponding to the direction vector are appended to the line segment; a vector corresponding to the normal vector of a plane is appended to the plane; eight points corresponding to the vertices of a block, 12 line segments corresponding to the edges, six plane regions corresponding to the faces, and a frame having the origin at the centroid and the axes all in parallel to any one of the edges are appended to the block; a line segment corresponding to the central axis of a cylinder, two plane regions corresponding to the top and bottom faces, and a frame having the origin at the centroid and an axis parallel to the central axis are appended to the cylinder; and a point corresponding to the origin of a frame and vectors corresponding to the directions of the axes thereof are appended to the frame.

EXAMPLES

Specific examples of trajectory teaching will now be described.

Step 1: Parametric definition of trajectories, storage in library and menu implementation.

Picking and placing an object is a typical example of a robotic task. In the following, the trajectory to which a tool frame placed on the robot hand should follow from pickup to placement is considered (this is called a pick-and-place trajectory) The object is gripped at the initial frame, lifted a little, and moved in the workspace toward the target frame where it is released.

As an example of the configuration of such a trajectory, a trajectory T1 is configured to pass the starting frame F1 at pickup, a frame F2 above F1, a frame F3 above the target position and a frame F4 at the target as shown in FIG. 6(b). F1 and F4 are set depending on the current and target configurations of the object and designated by the operator. Once F1 and F4 are set, typical frames F2 and F3 in the framework of the pick-and-place task, and the trajectory from F1 to F4, can be obtained automatically by using the following parametric modelling.

The steps of an example of the parametric modelling of trajectory T1 will now be described. (1) F1 is set as the starting-point frame. Although the frame is not necessarily instantiated yet in the model space and it can be defined in any way in practice, let it be defined here for example as the initial frame with the origin at (100, 300, 350) in the reference frame (world coordinate system, for example) without any rotation. (The general direct definition method is used.) (2) Similarly F4 is set as the end-point frame. (3) An adequate length vector (for example, 200) along the Z axis of the reference frame F0 is defined as vector V12. (The general direct definition method is used). (4) Vector V43 is defined in the same way as in (3). (5) The frame that effects translational motion of frame F1 by vector V12 is set as F2. (Translation as general indirect definition is used.) (6) The frame that effects translational motion of frame F4 by vector V43 is set as F3. (Translation as general indirect definition is used.) (7) A trajectory that passes through frames F1, F2, F3 and F4 corresponding to scalar values 0, 0.2, 0.8 and 1 is defined as T1. (The indirect definition method (n)① is used.)

Figure 4:
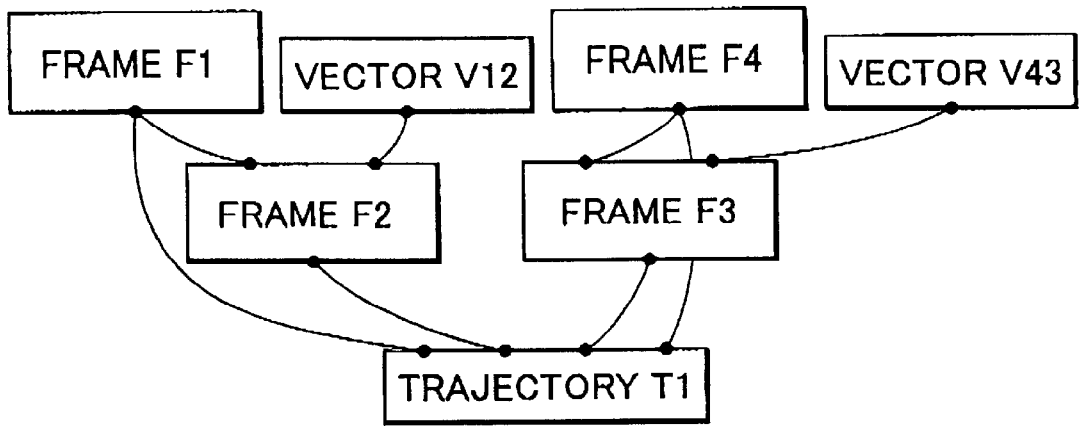
FIG. 4 shows a graphical tree representation of the relationships between geometric elements within the definition structure, shown on the display of FIG. 2.
Figure 5:
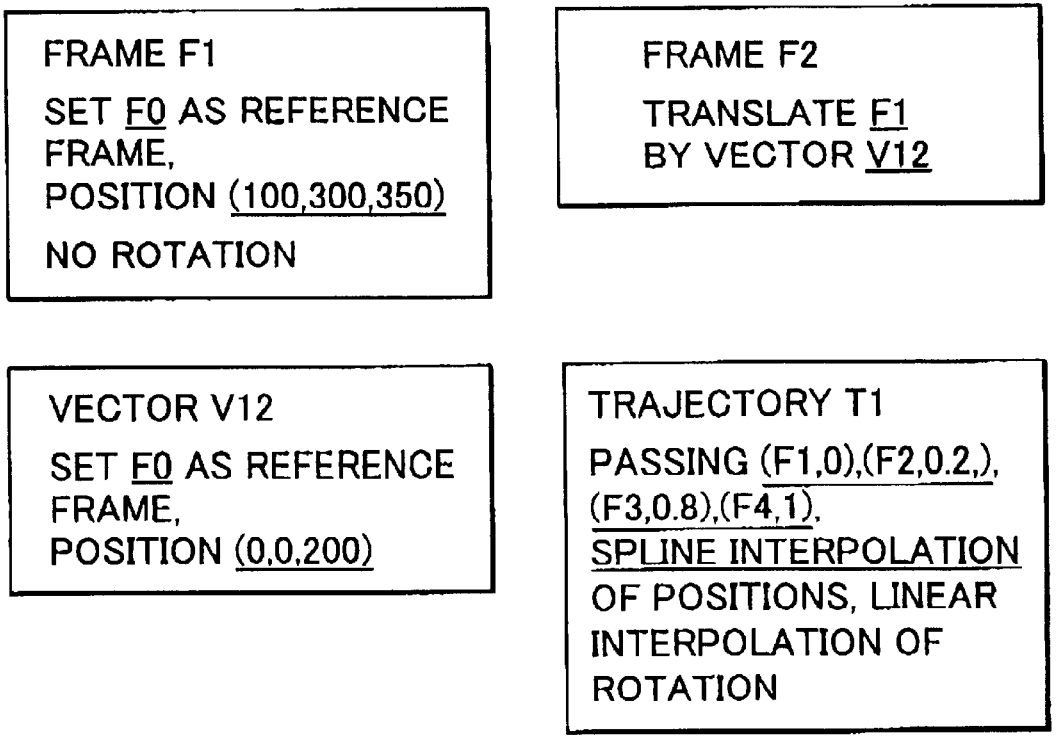
FIG. 5 shows examples of detail data of selected geometric elements, shown on the display of FIG. 2.

The trajectory T1 definition tree will be like the one shown in FIG. 4. Detailed data on the geometric elements can be displayed as shown in FIG. 5. In FIG. 5, parameters that can be changed are shown underlined. The trajectory T1 thus defined is saved to a library by selecting Save Definition on the file menu shown in FIG. 3. At this time, T1 is also enabled to be displayed on the task selection menu. Names etc. displayed on the menu are input via a software keyboard displayed on the display device.

Step 2: Preparing pick and place frames.

The frames used at pickup and placement are taught by the operator at the time of task execution. If the frames are already modelled, the trajectory can be readily instantiated using drag-and-drop operations. If the frames have not yet been modelled, first they are prepared. This preparation step can also be carried out after the provisional instantiation at the first part of step 3.

In this example, the aim of the task is to move the penholder from its position on the table in FIG. 6(a) to the top of the file case (FIG. 6(b)). With the arrangement as shown in the camera image of FIG. 6(a), the steps for defining pickup frame G1 and place frame G4 will now be described. (1) A point corresponding to a corner of the table is designated on the camera image to define point P1 (using direct definition method (a)). (2) The same process as in (1) is used to define point elements P2 and P3 corresponding to another two corners. (3) Plane S1 that passes through P1, P2 and P3 is defined (using indirect definition method (f)①). (4) Plane S1 is specified and the center of the bottom of the penholder is pointed on the camera image to define the center of the bottom of the penholder as point P4 (using indirect definition method (a)③). (5) S1 and P4 are designated to define cylinder C1 with a diameter and height that matches those of the penholder (using indirect definition method (k)②). (6) By providing a frame appended at the centroid of the cylinder C1 with necessary amount of translation and rotation for facilitating the hand to grip the penholder, frame G1 is defined (using the appended definition method and general means of translation and rotation). (7) A straight line is defined by tracing one edge of the bottom of the file case on the image, and over that line, a line segment L1 is defined by designating the end points of the edge (using direct definition method (b) and indirect definition method (c)②). (8) Line segment L1 is designated, and an angle of rotation around the line segment and edge lengths are assigned that match the contours of the file case to thereby define block B1 (using indirect definition method (j)①) (9) A cylinder that is configured by moving cylinder C1 so that the bottom face mates with the top face of the block B1 is defined as cylinder C2 (using general means of translation and rotation). (10) By providing a frame appended at the centroid of the cylinder C2 with the same amount of translation and rotation as given in (6), frame G4 is defined (using the appended definition method and general means of translation and rotation).

Step 3: Generating trajectory instances.

The task selection menu shown in FIG. 3 is used to select the parametric definitions of the target task prepared in step 1. At this point the trajectory is provisionally instantiated and shown in the definition tree display and model space.

Next, re-assignment of the provisionally instantiated trajectory is carried out to enforce the trajectory to match the target task trajectory. First, on the definition tree display or model space image display, F1 is selected, and the drag-and-drop operation up to pickup frame G1 defined in step 2 is performed to assign F1 to the actual pickup frame. In the same way, F4 is assigned to place frame G4 by the drag-and-drop operation. The other frames F2 and F3 that the trajectory comprises are described in terms of geometric constraints with respect to other geometric elements, and so are automatically determined if F1 and F4 are set. Thus, the trajectory T1 as a whole becomes a correct instantiation for the target pick-and-place operation. For better operability during the drag-and-drop operation, when the drag pointer comes near an assignable geometric element, the geometric element is highlighted to indicate to the operator that the geometric element is in a situation capable of being dropped.

Thus, as described, the target pick-and-place task trajectory can be readily instantiated by just using drag-and-drop operations to assign the start-point and end-point frames. To actually move tool frames along a trajectory, slider operations with the pointing device, for example, can be used to change the scalar variable.

Although here the operation has been described from the pick frame, prior to executing the pick-and-place trajectory, a trajectory is required that brings the hand from the current hand frame to the pick frame. Also, after the placement, another trajectory is required to move the hand from the placement frame to a retraction frame. These can be generated using the same type of procedure used for the pick-and-place trajectory.

Step 4: Changing trajectories.

The first three steps relate to the flow of the basic operation. However, depending on the situations a trajectory should be changed from the one obtained by the prescribed constraint conditions. For example, to avoid an obstacle, it might be desired to have F2 slantingly above F1 rather than directly overhead, or to have a greater separation, or to add another routing frame between F2 and F3.

Locating F2 off to slantingly above F1 or changing the separation is, for example, achieved by selecting V12 from the definition tree display and changing the numerical constraint parameters or substituting another vector for the vector. To add another routing frame, for example, a frame to avoid an obstacle is provided and added to the trajectory T1 at 0.5 to define a trajectory for an obstacle avoidance motion (using indirect definition method (n)①). In this way, after instantiation of parametric definitions, it is easy to modify the trajectories by changing the parameters of the related geometric elements, replacing the geometric elements themselves, or creating a new geometric elements based on the instantiated one.

Step 5: Menu implementation of changed trajectories.

If it is necessary to make the same type of changes for each task, teaching efficiency will be improved by storing the trajectories in a library as new parametrically defined trajectories, so they can be selected from a menu. This can be done by selecting the trajectory T2 changed in step 4 and selecting Save Definition on the file menu shown in FIG. 3, so it is shown on the menu. This makes it possible to utilize T2 next time in the similar situation, eliminating the need to make changes to T1 after instantiation. In accordance with this invention, robot position and orientation operations in a six-dimensional space can be readily taught from a remote location via a standard two-dimensional interface with display output and pointer input.

What is claimed is:

1. A robot operation teaching method comprising:
using a three-dimensional measuring system for measuring spatial coordinates corresponding to points designated on camera images, a display able to display an actual space image obtained by a camera or cameras with an overlay of a geometric model image corresponding to the actual space image, and a pointing device having at least two degrees of freedom to enable an operator to prepare in a model space simple geometric elements corresponding to the actual space image, thereby defining work trajectories;
wherein by using parametric modelling to supply definitions of geometric elements in advance, geometric elements for individual situations are produced by modifying a portion of geometric element assignments and parameters associated with the definitions.

2. The method according to claim 1, further comprising storing the geometric elements defined by the parametric modelling in a database so that the geometric elements can be selected from a menu to be instantiated.

3. The method according to claim 2, further comprising translating, rotating or aligning geometric elements associated with the geometric elements defined by the parametric modelling relative to arbitrary reference geometric elements to enable the geometric elements originally defined by parametric modelling to be redefined.

4. The method according to claim 3, further comprising using a teaching interface comprising a portable information terminal that includes a display for displaying two-dimensional information and a pointing device for inputting two-dimensional input, and that can exchange information with another device by wireless communication.

5. The method according to claim 2, further comprising using a teaching interface comprising a portable information terminal that includes a display for displaying two-dimensional information and a pointing device for inputting two-dimensional input, and that can exchange information with another device by wireless communication.

6. The method according to claim 1, further comprising a drag-and-drop operation to enable arbitrary geometric elements associated with the definitions of the geometric elements defined by the parametric modelling to be replaced by other geometric elements.

7. The method according to claim 2, further comprising a drag-and-drop operation to enable arbitrary geometric elements associated with the definitions of the geometric elements defined by the parametric modelling to be replaced by other geometric elements.

8. The method according to claim 7, further comprising translating, rotating or aligning geometric elements associated with the geometric elements defined by the parametric modelling relative to arbitrary reference geometric elements to enable the geometric elements originally defined by parametric modelling to be redefined.

9. The method according to claim 8, further comprising using a teaching interface comprising a portable information terminal that includes a display for displaying two-dimensional information and a pointing device for inputting two-dimensional input, and that can exchange information with another device by wireless communication.

10. The method according to claim 7, further comprising using a teaching interface comprising a portable information terminal that includes a display for displaying two-dimensional information and a pointing device for inputting two-dimensional input, and that can exchange information with another device by wireless communication.

11. The method according to claim 3, further comprising translating, rotating or aligning geometric elements associated with the geometric elements defined by the parametric modelling relative to arbitrary reference geometric elements to enable the geometric elements originally defined by parametric modelling to be redefined.

12. The method according to claim 11, further comprising using a teaching interface comprising a portable information terminal that includes a display for displaying two-dimensional information and a pointing device for inputting two-dimensional input, and that can exchange information with another device by wireless communication.

13. The method according to claim 6, further comprising using a teaching interface comprising a portable information terminal that includes a display for displaying two-dimensional information and a pointing device for inputting two-dimensional input, and that can exchange information with another device by wireless communication.

14. The method according to claim 1, further comprising translating, rotating or aligning geometric elements associated with the geometric elements defined by the parametric modelling relative to arbitrary reference geometric elements to enable the geometric elements originally defined by parametric modelling to be redefined.

15. The method according to claim 14, further comprising using a teaching interface comprising a portable information terminal that includes a display for displaying two-dimensional information and a pointing device for inputting two-dimensional input, and that can exchange information with another device by wireless communication.

16. The method according to claim 1, further comprising using a teaching interface comprising a portable information terminal that includes a display for displaying two-dimensional information and a pointing device for inputting two-dimensional input, and that can exchange information with another device by wireless communication.

17. A robot operation teaching apparatus comprising:
a three-dimensional measuring system capable of measuring spatial coordinates corresponding to points designated on camera images;
a display that displays an actual space image obtained by a camera or cameras overlaid by a geometric model image of geometric elements corresponding to the actual space image;
a pointing device for selecting a location; and
means for using parametric modelling to supply definitions of the geometric elements;
the apparatus being able to produce geometric elements adapted for each situation by modification of a portion of geometric element assignments and parameters associated with the definitions.

18. The apparatus according to claim 17, further comprising a database in which the geometric elements defined by the parametric modelling can be stored and a menu from which the stored geometric elements can be selected to be instantiated.

19. The apparatus according to claim 18, further comprising means using a drag-and-drop operation to enable arbitrary geometric elements associated with the definition of the geometric elements defined by the parametric modelling to be replaced by other geometric elements.

20. The apparatus according to claim 19, further comprising means for translating, rotating or aligning geometric elements associated with the geometric elements defined by the parametric modelling relative to arbitrary reference geometric elements to enable the geometric elements originally defined by parametric modelling to be redefined.

21. The apparatus according to claim 20, further comprising a teaching interface comprising a portable information terminal that includes a display for displaying two-dimensional information and a pointing device for inputting two-dimensional input, and that can exchange information with another device by wireless communication.

22. The apparatus according to claim 19, further comprising a teaching interface comprising a portable information terminal that includes a display for displaying two-dimensional information and a pointing device for inputting two-dimensional input, and that can exchange information with another device by wireless communication.

23. The apparatus according to claim 18, further comprising means for translating, rotating or aligning geometric elements associated with the geometric elements defined by the parametric modelling relative to arbitrary reference geometric elements to enable the geometric elements originally defined by parametric modelling to be redefined.

24. The apparatus according to claim 23, further comprising a teaching interface comprising a portable information terminal that includes a display for displaying two-dimensional information and a pointing device for inputting two-dimensional input, and that can exchange information with another device by wireless communication.

25. The apparatus according to claim 18, further comprising a teaching interface comprising a portable information terminal that includes a display for displaying two-dimensional information and a pointing device for inputting two-dimensional input, and that can exchange information with another device by wireless communication.

26. The apparatus according to claim 17, further comprising means using a drag-and-drop operation to enable arbitrary geometric elements associated with the definition of the geometric elements defined by the parametric modelling to be replaced by other geometric elements.

27. The apparatus according to claim 26, further comprising means for translating, rotating or aligning geometric elements associated with the geometric elements defined by the parametric modelling relative to arbitrary reference geometric elements to enable the geometric elements originally defined by parametric modelling to be redefined.

28. The apparatus according to claim 27, further comprising a teaching interface comprising a portable information terminal that includes a display for displaying two-dimensional information and a pointing device for inputting two-dimensional input, and that can exchange information with another device by wireless communication.

29. The apparatus according to claim 26, further comprising a teaching interface comprising a portable information terminal that includes a display for displaying two-dimensional information and a pointing device for inputting two-dimensional input, and that can exchange information with another device by wireless communication.

30. The apparatus according to claim 17, further comprising means for translating, rotating or aligning geometric elements associated with the geometric elements defined by the parametric modelling relative to arbitrary reference geometric elements to enable the geometric elements originally defined by parametric modelling to be redefined.

31. The apparatus according to claim 30, further comprising a teaching interface comprising a portable information terminal that includes a display for displaying two-dimensional information and a pointing device for inputting two-dimensional input, and that can exchange information with another device by wireless communication.

32. The apparatus according to claim 17, further comprising a teaching interface comprising a portable information terminal that includes a display for displaying two-dimensional information and a pointing device for inputting two-dimensional input, and that can exchange information with another device by wireless communication.

* * * * *